United States Patent [19]

Alberto

[11] 4,089,091

[45] May 16, 1978

[54] APPARATUS FOR THE AUTOMATIC INSERTION OF DIAPOSITIVES INTO THE FRAMES TO BE USED IN STEREOPTICON LANTERNS

[76] Inventor: Pietro Alberto, Via Lamarmora, 16, Biella, Italy

[21] Appl. No.: 749,397

[22] Filed: Dec. 10, 1976

[30] Foreign Application Priority Data

Dec. 30, 1975 Italy ............................... 30865 A/75

[51] Int. Cl.$^2$ ............................................... B23P 21/00

[52] U.S. Cl. ...................................... 29/785; 29/33 K; 29/786; 29/789; 29/806; 29/809

[58] Field of Search ................. 29/809, 771, 773, 785, 29/786, 787, 788, 789, 806, 818, 281.5, 33 K

[56] References Cited

U.S. PATENT DOCUMENTS

| | | | |
|---|---|---|---|
| 3,477,113 | 11/1969 | Tigges | 29/785 X |
| 3,553,815 | 1/1971 | McElvy | 29/785 X |
| 3,634,920 | 1/1972 | Maguire | 29/785 X |

*Primary Examiner*—Victor A. DiPalma

*Attorney, Agent, or Firm*—Kenyon & Kenyon, Reilly, Carr & Chapin

[57] ABSTRACT

An apparatus is provided for preparing framed diapositive assemblies by automatically coupling together a diapositive, an integrally formed frame and a transparent plate. The apparatus comprises three partially overlapping horizontal discs, each formed with the same number of openings, symmetrically positioned around a central vertical pivot. The discs are mounted on their pivots at a short mutual distance and the pivots, one of which is driven to rotate, are synchronized in motion. A magazine is positioned over and in correspondence with the upper disc and another magazine over and in correspondence with the lower disc, respectively for feeding into the openings the transparent plates and the frames. The opening on the intermediate disc for the diapositive, is formed at the periphery of the disc itself and comprises an elastic support means, such as two side brushes. At the central overlap zone a ram means is provided to push downward, through the opening in the discs, the plate and diapositive onto the underlying frame, resting on a stationary rigid surface as a base, which is interrupted at a discharge zone.

10 Claims, 7 Drawing Figures

APPARATUS FOR THE AUTOMATIC INSERTION OF DIAPOSITIVES INTO THE FRAMES TO BE USED IN STEREOPTICON LANTERNS

BACKGROUND OF THE INVENTION

The present invention relates to an automatic apparatus for inserting photographs of the "diapositive" type into the known suitable frames, which form the necessary support to allow the projection of the diapositives by appropriate known optical devices.

It is knwon that each complete, framed assembly of diapositive, ready to be projected, comprises three elements, namely a frame member having the largest thickness with respect to the other members, a second element being the diapositive itself, held within the frame by means of a third element adapted to be fitted into a proper slit provided on the frame, through a slight pressure. The elasticity of the material of the elements is generally utilized for clamping the frame to said third element, or small spring clips are used. In any case the purpose of such clamping member is that of fastening the film within the frame, preventing its loosening.

This type of framed assembly having the frame member of a single integral piece meets an ever growing favour in the trade and is more and more preferred in comparison with the type having the frame formed by two separate members, to be joined together by a fixed joint or adhesive, with the diapositive in an intermediate position. However such assemblies with an integrally formed frame show some difficulties in inserting the diapositive and its clamping by means of one or two transparent planar members which hold the diapositive within the frame. When such transparent holder members are made of glass, the framed unit must be manually assembled, due to the delicacy of the operation, whereas if they are made of plastic material, known semi-automatic devices may be used to accomplish the mutual coupling of the various members to be joined, although such devices have not yet given satisfactory results, considering both the safety of the operation, which does not overcome completely the possibility of damage to the diapositive itself, and the man work employed, as the complete automation of the operation has not been hitherto achieved.

SUMMARY OF THE INVENTION

It is therefore the object of the present invention to provide an apparatus which can automatically carry out the assembling of the three aforementioned members without showing the drawbacks of the assembling devices and methods according to the prior art.

The apparatus for inserting diapositives in integrally formed support frames according to the invention is characterized by comprising three partially overlapping horizontal discs, each of them laying on a different plane, being pivotally mounted about one of three vertical central pivots and provided with a number *n* of openings mutually spaced of 360°:*n* around each respective central pivot, each of the pivots being rotary operated by mutually synchronized motor means, whereby at each angular rotation of 360°:*n*, one opening for each disc will assume a position directly coinciding with one opening of each of the other discs, in the middle of the zone where the three discs are overlapped, said openings being substantially coextensive; a ram means being provided to give a downwardly directed thrust at said opening coincidence zone, and actuated to operate whenever such coincidence occurs at every 360°:*n* angle, there being further provided, at the bottom of the lowest positioned disc, means adapted to form the continuous, closed base of the openings on said lowest disc, directly in contact to the lower surface thereof, said base means comprising a discharge zone wherein said opening is without bottom and which is positioned past said overlap and coincidence zone along the rotation direction of said lowest disc.

As it will better observed in the following, the apparatus of the invention in order to have a high continuous production may be used in co-operation with known devices for continuously feeding and cutting the diapositive film, as well as with magazines for loading the formed frames and the transparent holder members, usually made of plastics.

BRIEF DESCRIPTION OF THE DRAWINGS

These objects, and features will be fully understood with reference to the following detailed description of an embodiment given by way of a non-limiting example of the apparatus according to the invention, in connection with the accompanying drawings, wherein.

DETAILED DESCRIPTION OF THE PREFERRED EMBODIMENT

Figure 1:
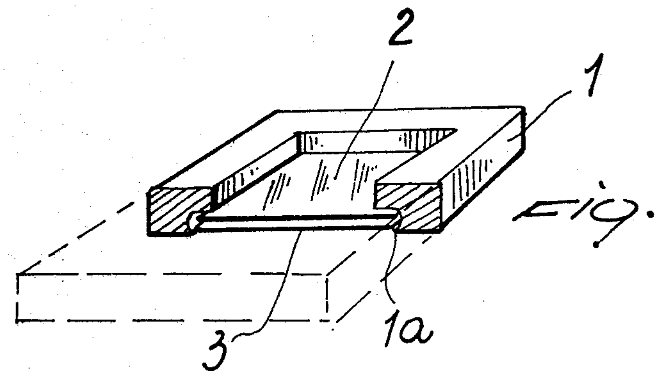
FIG. 1 shows a perspective sectional view of a complete assembly of diapositive with frame and holder member, of the type adapted to be assembled by the apparatus of the invention.

With reference to FIG. 1, a complete diapositive frame, of the type to be assembled by the apparatus of the invention, comprises an integrally formed frame 1, having an inner slit 1*a* adapted to house a diapositive element 2 and a transparent third member 3, to hold diapositive 2 clamped in the slit 1*a*. The member 3 is such to be fixed in the slit 1*a* either through a slight thrust, due to the elasticity of the materials employed, of resilient plastics, or by using small spring clips.

Figure 2:
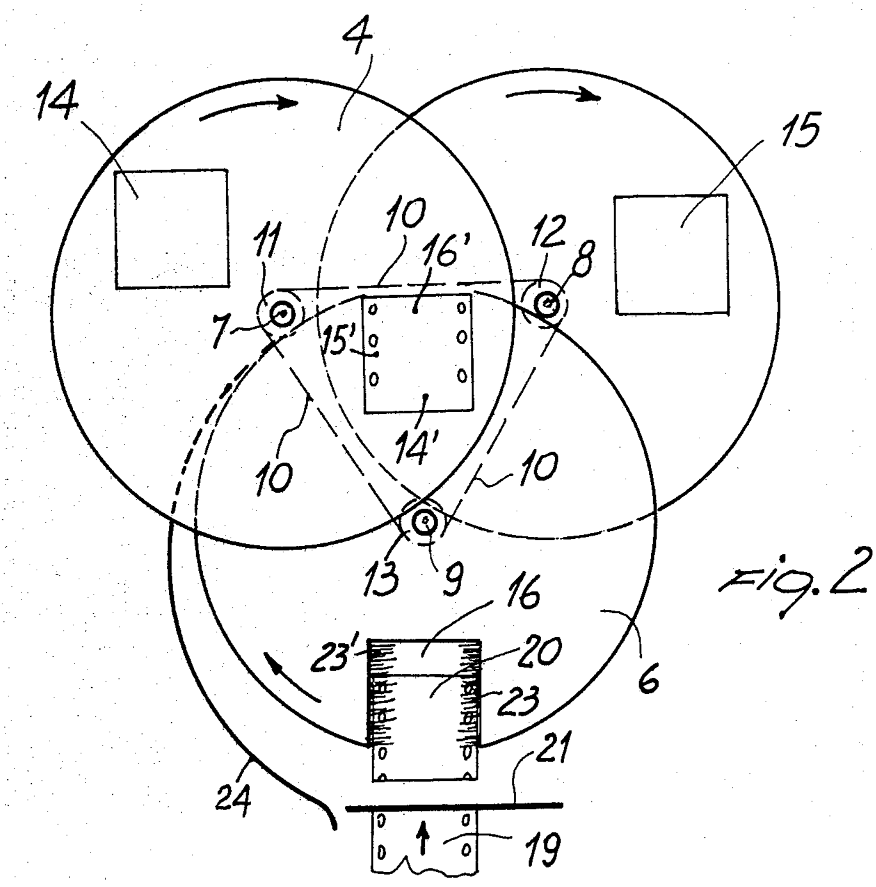
FIG. 2 shows a diagrammatic, fragmentary top plan view of an embodiment of apparatus according to the invention.
Figure 3:
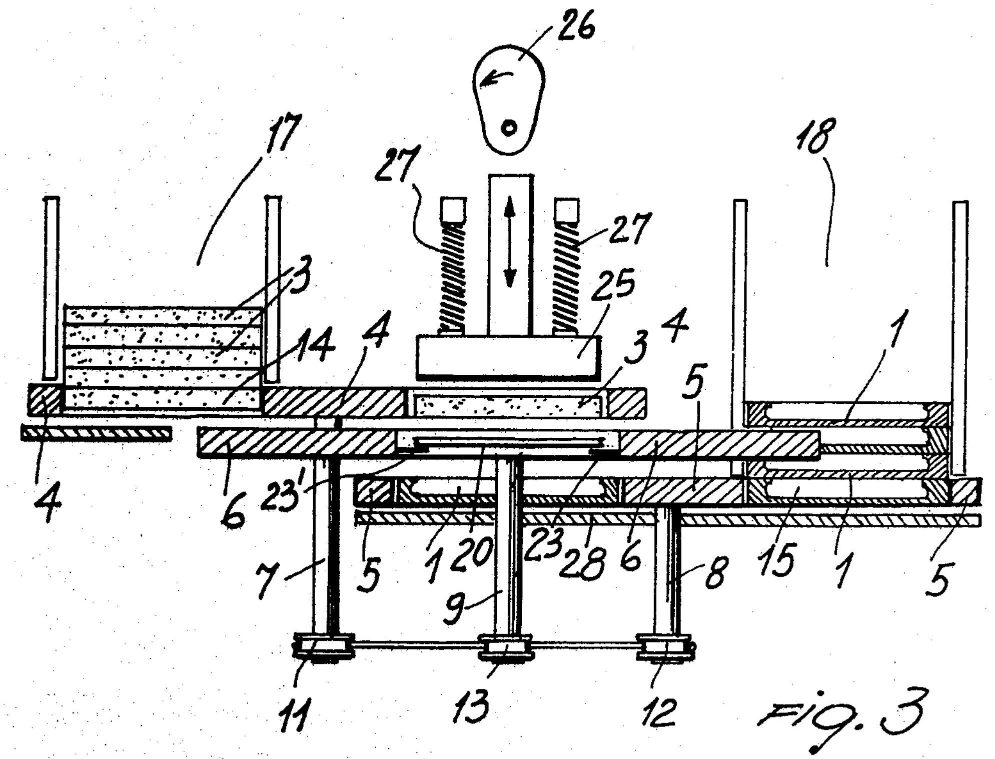
FIG. 3 shows a diagrammatic side view of the apparatus represented at FIG. 2.
Figure 4:
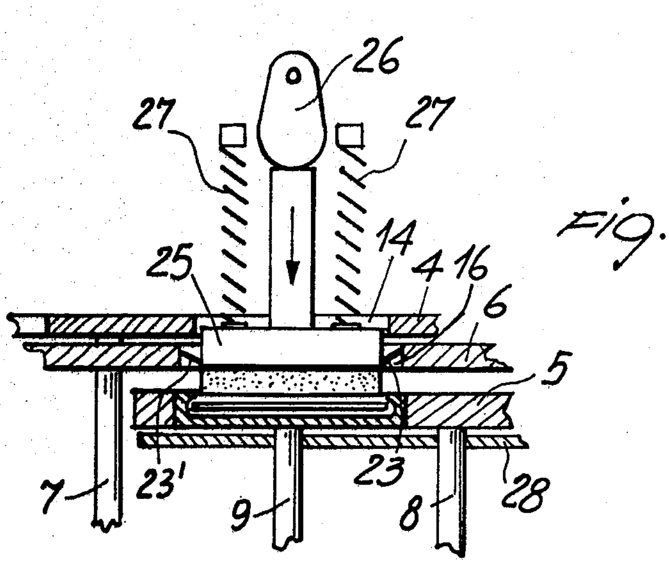
FIG. 4 shows a detail of the same FIG. 3 at a subsequent operational moment.

The apparatus according to the invention, which can effect automatically the assembling operation of the three above mentioned elements, namely frame 1, diapositive 2 and transparent holder member 3, is represented in one embodiment thereof at FIGS. 2, 3, 4. From these figures it is seen that such apparatus substantially comprises three discs 4, 5, 6 rotatory mounted on three vertical axial pivots 7, 8, 9 respectively about vertical central axes, along three different horizontal planes, partially overlapping at a very short distance so as to define a zone which all the three discs have in common. The three rotation pivots 7, 8, 9 of the discs are mutually connected by a chain or a toothed belt 10 through gears 11, 12 and 13 fixedly mounted on the pivots, so that the motion of the three pivots, and therefore of the three discs results strictly synchronized.

Each disc shows, in the illustrated embodiment, two recesses as deep as the disc itself and spaced apart exactly at 180°, but it is to be understood that such recesses or openings may generally be in a number other than two, generally higher, or even in the number of one single opening on each disc. Such openings have been designated by reference numerals 14, 14' for disc 4; 15, 15' for disc 5 and 16, 16' for disc 6. They are square-shaped or generally rectangular, substantially co-extensive. More precisely however, the openings 14, 14' of the disc 4 at the top position have a slightly smaller size, as they are designed to hold the inner member 3 to be placed within frame 1, the openings 15, 15' of the lowest disc 5 have a greater size as these have to hold the frames 1 and the openings 16, 16' of the intermediate disc 6 will have a slightly larger size than those designated 14, 14' as they must hold the diapositive film 2.

With particular reference to FIG. 3, over the opening 14 and correspondingly therewith there is provided a magazine 17 of the transparent holder members 3, while in a magazine 18, positioned over and in direct correspondence with the opening 15, all the frames 1 are stored.

The chain or toothed belt 10 is driven by motor means (not shown) such as to cause the discs to effect intermittent rotations of 180° with intermediate stops of a time length which is synchronized with other motions, as it will be explained, by means of devices known in the art. Of course, if generally speaking the openings on each disc are in number of *n*, each rotation will be of 360°:*n* and the stop upon each rotation will occur with one opening in correspondence and contact with the overhanging magazine, whereby when the openings 14 and 15 are positioned exactly under the magazines 17 and 18, a transparent plate 3 and a frame 1 simply drop by gravity within the openings 14, 15. At the same time the other openings in the overlap zone of the discs are positioned exactly in mutual coincidence, one on the other, so as to form a single passage or throughhole.

At the same moment, the diapositive film 19 is inserted into one of the openings formed on the intermediate disc 6 and this preferably happens as follows. First of all the opening is provided at the outer edge of the disc 6, and not on its inner zone, as for the other discs, whereby a diapositive film 19 can be continuously fed (see FIG. 2) and a section 20 thereof, corresponding to a picture photogram, enters opening 16. A pair of hinged shears 21, operated in a known manner, such as by cam, or electromagnet, etc. close their blades and cut the diapositive picture 20 which thus is caused to be inserted within opening 16 of proper size. According to a particular aspect of the present invention, this photogram or diapositive 20 is caused to rest upon an elastic means 23, 23' formed e.g. by two rows of bristles, one on each side of the opening 16, positioned so as to provide two brushes directed inwardly within the opening itself. The purpose of this pair of brushes 23, 23' is double and above all is that of supporting the diapositive element 20 while preventing during the subsequent rotation of the diapositive from a creeping contact with the discs, which could damage the diapositive itself. The other purpose will be better explained in the following. When the diapositive 20 is housed in the opening 16, the apparatus is in the situation represented at FIG. 2.

Subsequently, upon a 180° rotation of the three discs, the openings loaded as previously stated with a frame 1, a transparent support member 3 and a diapositive 2 or film photogram 20, will assume at the next stop the positions 14', 15', 16' respectively as shown at FIG. 2. In other words they will be exactly overlapping on the interference zone of the three discs, as it clearer results from FIG. 3. There is substantially represented the transparent plate 3 carried by the disc 4 exactly on the film 20 carried by the disc 6 and supported by brushes 23, 23', positioned in turn on the frame 1 carried by the disc 5.

It should be appreciated that during the rotation of the disc 6, a wall 24, of elliptic shape, encircling a portion of the periphery of the disc 6 itself, has caused the photogram 20 to be completely housed in the opening 16 by pushing it to the exact position, without projecting from the disc edge.

At the situation represented at FIG. 3, when a further frame 1 drops into the opening 15 of the disc 5 and a further plate 3 drops into the opening 14 of the disc 4, a ram means 25 provided exactly over the central coincidence and overlap zone is opeated by a cam means 26 driving it downwardly thus thrusting member 3, which in turn thrusts film element 20 downwardly through bending of bristles 23, 23' until causing film 20 and flexible member 3 to be inserted in the slit 1*a* of the frame 1. Now the other function of the bristle brushes 23, 23' should be clear, that is their smooth and gradual bending during the thrust action, thus causing the film 20 to be lowered and clamped within frame 1 through an even movement guided by those bristles. It should be understood again that during the whole operation the apparatus is absolutely still. Subsenquently the ram means 25 moves again upwardly, such as under the thrust of spring 27, up to be lifted over the rotatory disc 4, thus allowing the subsequent new rotation cycle of the three discs to start.

Figure 5:
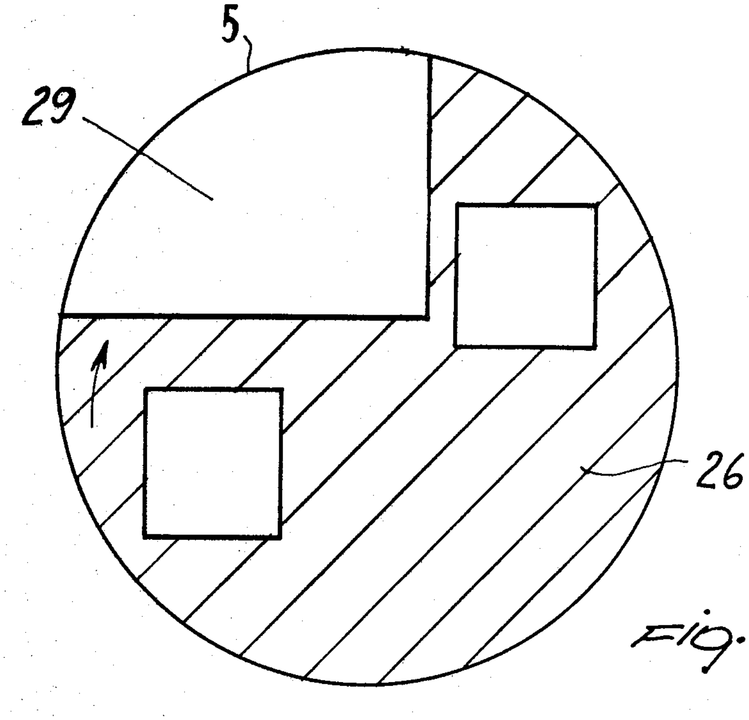
FIG. 5 shows a top plan view of a further stationary lower disc, provided as bottom enclosure means and downwardly discharge means for the framed diapositives upon assembling.
Figure 6:
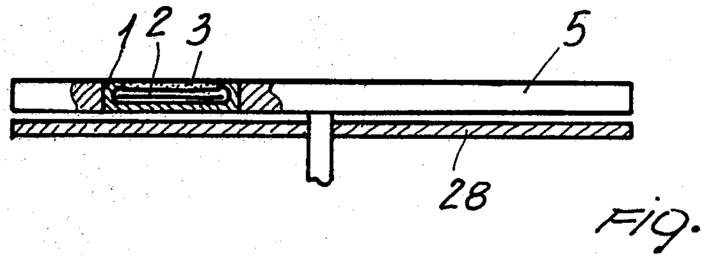
FIGS. 6 and 6A show at two subsequent operational moments the already assembled diapositive, respectively just after the assembling and during the discharge operation.
Figure 6A:
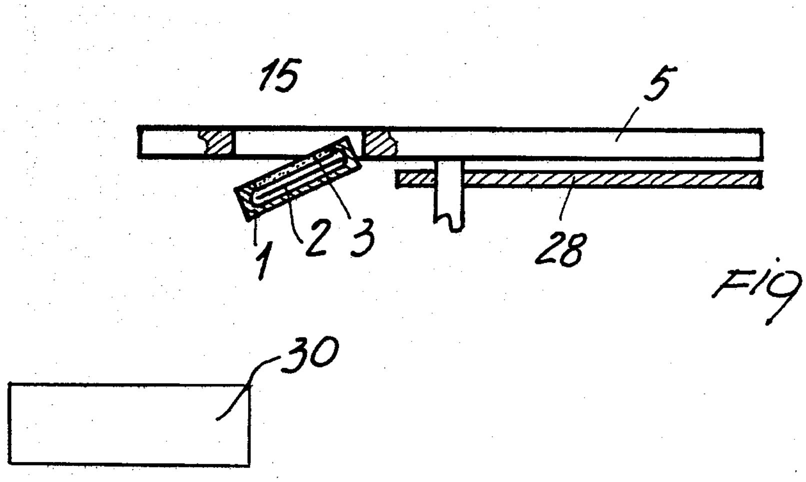

A rigid planar member 28, as the disc shown at FIG. 5 is provided directly under the disc 5 which carries the three assembled elements. After the assembling operation, the unit formed by frame 1 with the diapositive 2 and the covering holder plate 3 is driven by disc 5 while sliding on the upper surface of the disc 28 until the position 29, where an aperture is provided or in any case the member 28 ends. At this position the assembled frame unit, no longer supported, will drop downward by gravity and is received for example within a container 30. The opening 15 of the disc 5 will be therefore able to receive another frame 1, while opening 14 of the disc 4 and opening 16 of the disc 6 have been already discharged of their contents by means of the ram 25, which had brought plate and diapositive downwardly onto the disc 5, and therefore are also ready to receive another member 3 and another film section.

It appears from the foregoing that the cycle is continuous and the feeding occurs at the same time as the assembling operation, whereby it will be only necessary to control the feeding of the magazines 17 and 18, at intervals.

It should be clear that the feed openings for each disc could be in a different number; for example if they were three, the rotation would be of 120° each time, while if they were four the rotation would be of 90° etc. Even a single opening could be provided for each disc and in this case the rotation would be of 360°, but with an intermediate stop at 180° to render possible the loading.

Further modifications and/or additions could be provided bt those skilled in the art without departing from the scope of the invention, as defined by the appended claims.

I claim:

1. Apparatus for automatically inserting diapositives into the frames to be used in stereopticon lanterns, which comprises three partially overlapping horizontal discs each of them laying on a different plane, being pivotably mounted about a respective one of three vertical central pivots and provided with a number *n* of openings mutually spaced of 360°:*n* around each respective one of said central pivots, each of said pivots being rotary operated by mutually synchronized motor means whereby at each angular rotation of 360°:*n* one opening for each disc will assume a position directly coinciding with one opening of each of the other discs, in the middle of the zone where the three discs are overlapped, said openings being substantially coextensive; a ram means being provided to give a downwardly directed thrust at said opening coincidence zone, and actuated to operate whenever such coincidence occurs at every 360°:*n* angle; there being further provided, at the bottom of the lowest positioned disc, means adapted to form a continuous, closed base of the openings formed on said lower disc, directly in contact with the lower surface thereof, said base means being interrupted at a discharge zone, wherein said opening is bottomless and which is positioned past said overlap and coincidence zone in the sense of rotation of said lower disc.

2. Apparatus according to claim 1, wherein each opening of said intermediate disc is formed at the outer edge of the disc itself, so as to house a section of film carried forward radially by means of known feeding means and cut from a continuous film tape by known cutting means.

3. Apparatus according to claim 2, wherein the side edges of each opening of the intermediate disc are provided with flexible supporting means mutually facing and directed toward the central zone of the opening.

4. Apparatus according to claim 3, wherein said flexible supporting means comprises two opposite rows of bristles substantially directed in horizontal sense and fixed at an end thereof at either side edge of the said openings.

5. Apparatus according to claim 1 wherein in correspondence of at least one of the openings on the upper disc and at least one opening on the lower disc, at the position where other openings of the three discs are correspondingly overlapping, there are provided respectively a magazine of transparent holder plates and a magazine of frames for diapositive assemblies, both having the discharge aperture flush with the upper surface of the upper disc and lower disc respectively.

6. Apparatus according to claim 5 wherein the openings of the lower disc adapted to house said frames have the largest size, the openings of said upper disc adapted to house said transparent plates have the smallest size and said openings of said intermediate disc have an intermediate size slightly larger than the latter.

7. Apparatus according to claim 1, wherein a cam means is provided to operate said ram means at each stop of the three discs at the position where the three openings, one for each disc, are overlapping.

8. Apparatus according to claim 7, wherein said ram means comprises also spring return means to reset back to the original position upon each operation of said cam.

9. Apparatus according to claim 7, wherein said cam is driven by the same motor means for operating said pivots which are mutually connected by a driving means engaging gears respectively fixed on said three pivots.

10. Apparatus according to claim 1, wherein said means comprises a rigid planar stationary member having the upper surface in contact with the lower surface of said disc substantially co-extensive therewith, except for said discharge zone, wherein the lower surface of said lower disc and the opening are bottomless.

* * * * *